United States Patent
Hu et al.

(10) Patent No.: US 11,604,401 B2
(45) Date of Patent: *Mar. 14, 2023

(54) LIGHT SOURCE DEVICE AND PROJECTION APPARATUS

(71) Applicant: APPOTRONICS CORPORATION LIMITED, Guangdong (CN)

(72) Inventors: Fei Hu, Shenzhen (CN); Haixiong Hou, Shenzhen (CN); Yi Li, Shenzhen (CN)

(73) Assignee: APPOTRONICS CORPORATION LIMITED, Shenzhen (CN)

( * ) Notice: Subject to any disclaimer, the term of this patent is extended or adjusted under 35 U.S.C. 154(b) by 49 days.

This patent is subject to a terminal disclaimer.

(21) Appl. No.: 17/210,353

(22) Filed: Mar. 23, 2021

(65) Prior Publication Data

US 2021/0208492 A1 Jul. 8, 2021

Related U.S. Application Data

(63) Continuation of application No. 16/321,753, filed as application No. PCT/CN2017/081479 on Apr. 21, 2017, now Pat. No. 10,989,998.

(30) Foreign Application Priority Data

Aug. 5, 2016 (CN) .......................... 201610638639.1

(51) Int. Cl.
 *G03B 21/20* (2006.01)
(52) U.S. Cl.
 CPC ........... *G03B 21/208* (2013.01); *G03B 21/20* (2013.01); *G03B 21/204* (2013.01); *G03B 21/2013* (2013.01)

(58) Field of Classification Search
 CPC .................. G03B 21/208; G03B 21/20; G03B 21/2013; G03B 21/204
 See application file for complete search history.

(56) References Cited

U.S. PATENT DOCUMENTS 10,824,066 B2* 11/2020 Hu ........................ G03B 21/208
10,989,998 B2* 4/2021 Hu .......................... G03B 21/20
(Continued)

FOREIGN PATENT DOCUMENTS

CN 102753113 A 10/2012
CN 103913937 A 7/2014
(Continued)

OTHER PUBLICATIONS

Extended European Search Report of corresponding European Patent Application No. 17836183.8—6 pages (dated Mar. 23, 2020).
(Continued)

*Primary Examiner* — Magda Cruz
(74) *Attorney, Agent, or Firm* — Knobbe, Martens, Olson & Bear LLP (57) ABSTRACT

Provided is a light source device, including: a first light source module, a set of lenses, a first light-homogenization component, a first light-combination device, and a wavelength conversion device. The first light source module is configured to emit a first light beam having first wavelength. The set of lenses and the first light-homogenization component are located in propagation path of the first light beam. The set of lenses is configured to converge the first light beam. The first light-homogenization component is configured to homogenize the first light beam. A second light beam formed by homogenization is incident on the first light-combination device, and the first light-combination device is located at a focus position of the set of lenses. The wavelength conversion device is located in propagation path of a third light beam emitted from the first light-combination (Continued)

device and configured to form excited light having second wavelength under excitation.

20 Claims, 6 Drawing Sheets

(56) References Cited

U.S. PATENT DOCUMENTS

| | | |
|---|---|---|
| 2012/0242912 A1 | 9/2012 | Kitano |
| 2012/0316397 A1* | 12/2012 | Berben ................ G03B 21/204 600/182 |
| 2013/0088471 A1 | 4/2013 | Kitano |
| 2013/0250546 A1 | 9/2013 | Hu |
| 2015/0362830 A1* | 12/2015 | Liao ................... G03B 21/2066 353/31 |
| 2016/0085143 A1 | 3/2016 | Hu |
| 2017/0195645 A1* | 7/2017 | Sakata ................ G02B 27/283 |
| 2017/0205695 A1* | 7/2017 | Hu ..................... G03B 21/2066 |
| 2018/0210329 A1 | 7/2018 | Sakata |
| 2019/0018308 A1 | 1/2019 | Takizawa |
| 2019/0110029 A1* | 4/2019 | Wang .................. H04N 9/3114 |
| 2019/0235369 A1 | 8/2019 | Janssens |
| 2020/0124952 A1 | 4/2020 | Guo |
| 2021/0318602 A1* | 10/2021 | Guo ..................... G03B 21/206 |

FOREIGN PATENT DOCUMENTS

| | | | |
|---|---|---|---|
| CN | 104765238 A | 7/2015 | |
| CN | 105319819 A | 2/2016 | |
| CN | 205353549 U | 6/2016 | |
| CN | 205992114 U | 3/2017 | |
| EP | 2650593 A1 | 10/2013 | |
| JP | 2016-090850 A | 5/2016 | |
| WO | WO-2019061822 A1 * | 4/2019 | ............ G03B 21/20 |

OTHER PUBLICATIONS

International Search Report of corresponding Patent Application No. PCT/CN2017/081479—3 pages (dated Jul. 12, 2017).
Office Action received in EP 17836183.8, dated Apr. 28, 2022.

* cited by examiner

LIGHT SOURCE DEVICE AND PROJECTION APPARATUS

CROSS-REFERENCE TO RELATED APPLICATIONS

This application is a continuation of U.S. patent application Ser. No. 16/321,753, filed on Jan. 29, 2019, which is a National Stage of International Application No. PCT/CN2017/081479, filed Apr. 21, 2017, which claims priority to Chinese Patent Application No. 201610638639.1, filed Aug. 5, 2016. All of the afore-mentioned patent applications are hereby incorporated by reference in their entireties.

TECHNICAL FIELD

The present disclosure relates to the field of light source technologies, and in particular, to a light source device and a projection device.

BACKGROUND

Laser light, as a light source with high brightness, good monochromaticity and good directivity, has been widely used in projection devices in recent years. The light source with good monochromaticity and high brightness plays an important role in the quality of the displayed image, and greatly improves the performance of the projection device. Therefore, the laser light has been one mainstream light source for the projection device. However, since the light field of the laser light generally does not have a uniformly distributed light intensity over the entire cross section, such as a Gaussian distribution of the laser light, the light field distribution of the laser light in the light area will not be uniform. For a laser projection device which requires a high light uniformity, the non-uniform light intensity distribution will directly affect the performance of the system.

SUMMARY

Technical Problem to be Solved

At present, the existing laser light source adopts a manner of extension spectrophotometry. The laser light is homogenized by a light-homogenization rod and then an end surface of the rod is imaged onto a fluorescence wheel, so that the light spot irradiating on the fluorescence wheel is relatively uniform and the light power density is relatively low. However, the area is large when passing through a partially coating film. Compared with other light, light having the same or similar wavelength as the incident light has greater loss, and its angular distribution is not uniform, which has a great influence on the light uniformity of the system.

Therefore, how to further improve the efficiency and uniformity of the light source is a technical problem to be solved in the art.

Solution to the Problem

The present disclosure provides a light source device and a projection device, which can improve the efficiency and uniformity of the light source so as to improve the quality of the displayed image.

The present disclosure provides a light source device, including:

a first light source module, a set of lenses, a first light-homogenization component, a first light-combination device, and a wavelength conversion device;

the first light source module is configured to emit a first light beam having a first wavelength;

the set of lenses and the first light-homogenization component are located in a propagation path of the first light beam, the set of lenses is configured to converge the first light beam, the first light-homogenization component is configured to homogenize the first light beam, a second light beam formed after homogenization is incident on the first light-combination device, and the first light-combination device is located at a focus position of the set of lenses;

the wavelength conversion device is located in a propagation path of a third light beam emitted from the first light-combination device and is configured to generate excited light having a second wavelength under excitation.

Optionally, the first light-homogenization component is an array of microlenses formed by a plurality of lenses, the first light beam is incident at a light entrance of the array of microlenses, and is emitted from a light exit of the array of microlenses to the first light-combination device.

Optionally, the set of lenses includes a first light converging lens, and the first light-combination device is located at a focus position of the first light converging lens;

or the set of lenses includes a combination of a plurality of lenses, and the first light-combination device is located at a focus position of a lens of the plurality of lenses closest to the first light-combination device in a propagation path of a light beam.

Optionally, the first light source module is an array of first lasers, and a length-width ratio of the array of first lasers is equal to a length-width ratio of an array of microlenses of a spatial light modulator.

Optionally, the light resource device further includes: a set of compression lenses, located in front of the first light-homogenization component in the propagation path of the light beam, and configured to compress a light spot of the first light beam.

Optionally, the set of compression lenses includes one or more of a positive compression lens or a negative compression lens.

Optionally, the light resource device further includes:

a second light source module configured to emit a fourth light beam having a third wavelength; and a second light-combination device located in a light path of the first light beam and the fourth light beam, and configured to transmit or reflect the first light beam and correspondingly reflect or transmit the fourth light beam.

Optionally, the first light source module includes an array of blue lasers, the second light source module includes an array of red lasers, the first light-combination device combines light beams of the first light beam and the fourth light beam after being homogenized by the first light-homogenization component.

Optionally, the first light-combination device is a dichroscope and configured to split the second light beam, and a first sub-light light is transmitted or reflected to the wavelength conversion device.

Optionally, the light resource device further includes a scattering plate corresponding to the first sub-light from the first light-combination device, and a second sub-light is reflected or transmitted to the scattering plate.

Optionally, the light resource device further includes:

a third light source module, a second light-homogenization component and a third light-combination device;

the third light source module is configured to emit a fifth light beam having a fourth wavelength;

the second light-homogenization component is located in a propagation path of the fifth light beam and configured to homogenize the fifth light beam, and a sixth light beam formed after homogenization and the second light beam together are incident on the third light combination device and then are incident on the first light-combination device.

Optionally, the first light source module is an array of red lasers, the third light source module is an array of blue lasers, the second light-homogenization component is a light-homogenization rod, the first light-combination device makes a middle portion of blue light incident on the scattering plate and makes red light and a remaining portion of the blue light incident on the wavelength conversion device.

Advantageous Effect

The present disclosure provides a projection device, including any of the abovementioned light source devices.

According to the light source device and the projection device of the present disclosure, the light beam emitted from the first light source module is converged and homogenized by the set of lenses and the first light-homogenization component, and the light beam formed after homogenization is incident on the first light-combination device. The first light-combination device is located at the focus position of the set of lenses. Surface distribution of the first light source module is imaged onto the wavelength conversion device, which reduces an area required for the first light-combination device to split the light, and improves uniformity and efficiency of the system.

BRIEF DESCRIPTION OF DRAWINGS

In order to more clearly illustrate technical solutions in embodiments of the present disclosure or in the prior art, the accompanying drawings used in the embodiments and in the prior art are briefly introduced as follows. It should be noted that the drawings described as follows are merely part of the embodiments of the present disclosure, other drawings can also be acquired by those skilled in the art without paying creative efforts.

DESCRIPTION OF EMBODIMENTS

In order to make the purpose, technical solutions, and advantages of the embodiments of the present disclosure to be understandable, the technical solutions in the embodiments of the present disclosure are described in the following with reference to the accompanying drawings. It should be understood that the described embodiments are merely a part of the embodiments of the present disclosure, rather than all of them. All other embodiments obtained by those skilled in the art without creative efforts according to the embodiments of the present disclosure are within the scope of the present disclosure.

Figure 1:
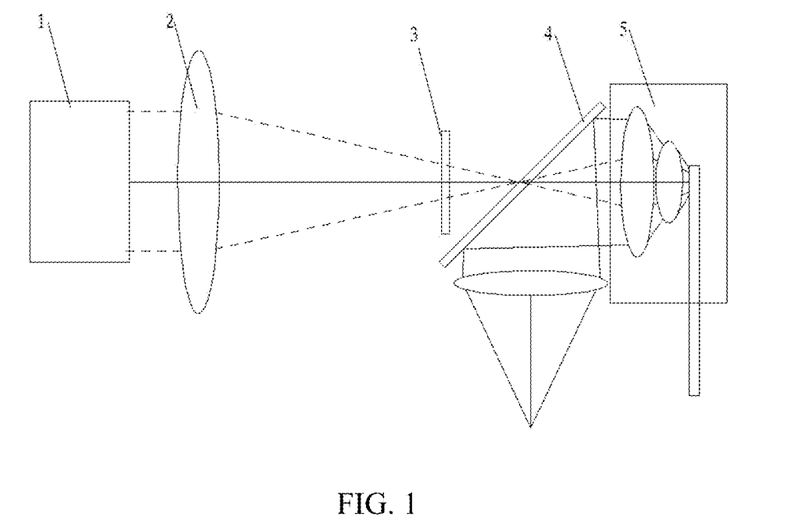
FIG. 1 is a schematic structural diagram of a light source device according to a first embodiment of the present disclosure.

FIG. 1 is a schematic structural diagram of a light source device according to a first embodiment of the present disclosure. With reference to FIG. 1, the light source device includes:

a first light source module 1, a set of lenses 2, a first light-homogenization component 3, a first light-combination device 4, and a wavelength conversion device 5.

The first light source module 1 is configured to emit a first light beam having a first wavelength.

The set of lenses 2 and the first light-homogenization component 3 are located in a propagation path of a first light beam. The set of lenses 2 is configured to converge the first light beam, and the first light-homogenization component 3 is configured to homogenize the first light beam. A second light beam is formed after homogenization and incident on the first light-combination device 4. Herein, the first light-combination device 4 is located at a focus position of the set of lenses 2.

The wavelength conversion device 5 is located in a propagation path of a third light beam emitted from the first light-combination device 4, and is configured to generate excited light having a second wavelength when being excited.

According to the light source device of the present disclosure, the light beam emitted from the first light source module is converged and homogenized by the set of lenses and the first light-homogenization component, and the light beam formed after homogenization is incident on the first light-combination device. The first light-combination device is located at the focus position of the set of lenses. Surface distribution of the first light source module is imaged onto the wavelength conversion device, which reduces an area required by the first light-combination device for extension spectrophotometry, and improves uniformity and efficiency of the system.

The first light source module 1 can be a solid-state light source LED or a laser. In this embodiment, specifically, an array of first lasers may be adopted. A length-width ratio of the array of first lasers is the same as a length-width ratio of an array of microlenses of a spatial light modulator. With such an arrangement, the efficiency can be improved, so that the optical expansion amount can be matched, which is convenient for processing such as light homogenization and light shaping of subsequent light paths.

The set of lenses 2 may be a first light converging lens. When the set of lenses is a single lens, as shown in FIG. 1, the first light-combination device 4 is located at a focus position of the light converging lens. Moreover, when the set of lenses 2 is a combination of a plurality of lenses, the first light-combination device 4 is located at a focus position of the lens closest to the first light-combination device in the propagation path of the light beam.

The first light-homogenization component 3 is configured to homogenize the first light beam such that light intensity of the first light beam is uniform, thereby improving the quality of the displayed image, and thus improving the performance of the projection device. The first light-homogenization component 3 may specifically be an array of microlenses composed by a plurality of lenses. The first light beam is incident at a light entrance of the array of microlenses and then is emitted from a light exit of the array of microlenses array to the first light-combination device. Moreover, the first light-homogenization component can also be a fly-eye lens pair. Herein, any components capable of homogenizing light can be used, which will not be limited to these two types.

In this embodiment, the array of microlenses may be composed by a plurality of same lenses, or may be composed by a plurality of different lenses. The array composed by a plurality of lenses may be in a rectangular arrangement, a hexagonal arrangement or a triangular arrangement, which does not affect implementation of the present disclosure.

When the first light beam is incident on the plurality of lenses of the array of microlenses, each lens splits the first light beam into sub-beams having a same scale, and then the sub-beams are converged by the first light-combination device and superimposed on a focal plane of the first light-combination device to form a uniform light field, so that the first light beam is homogenized. That is, the light-homogenization principle of the array of the lenses is to split the first light beam into a plurality of sub-beams having a same scale, and then superimpose the sub-beams to achieve light homogenization. Therefore, a distribution uniformity of the light field depends on the number of the sub-beams or the number of the lenses, and herein, the number of the sub-beams further depends on the number of the lenses. For example, when the first light-homogenization component includes 3 lenses, the first beam is split into 3 sub-beams. Thus, the larger the number of the lenses is, the larger of the number of the sub-beams into which the first beam is split is, and the more uniform the resulting light path distribution of the light beam is. The number of the lenses included in the first light-homogenization component is determined by the designer according to actual needs and may not be as large as possible. Moreover, after the first light beam passes through the array of lenses, high energy utilization can be achieved since there is no necessary for multiple times of reflections. Preferably, the lenses can be made by coating with an anti-reflection film and selecting a material having a small absorption coefficient at a working wavelength (the first wavelength in this embodiment), so as to further improve the energy utilization, but not limited thereto. Moreover, a thickness of the array of lenses is smaller than a length of the integrator rod, which is advantageous for reducing an axial dimension of the device.

The first light-combination device 4 may specifically be a dichroscope. When the first light source module 1 is an array of blue lasers, the dichroscope is coated in such a manner that a blue light beam can pass through a middle area and light having other colors will be reflected. For example, specifically, a yellow light beam is reflected, the yellow light beam combines with the unexcited blue laser light to form white light, and the other area reflects all of the incident light beams.

The wavelength conversion device 5 may specifically include: a fluorescence collection lens and a fluorescence wheel. The fluorescence wheel can be divided into a light-transmitting area and a conversion area. Due to rotation of the wavelength conversion device, an incident light beam passes through the light-transmitting area when the incident light beam is incident on the light-transmitting area, and a light beam having a second wavelength is emitted from a first conversion area when the incident light beam is incident on the first conversion area. Preferably, the first conversion area is coated with a fluorescent powder, and when the incident light beam is incident on the fluorescent powder, the first conversion area emits the light beam having the second wavelength. Different fluorescent powders lead to different wavelengths of the light beams emitted from the first conversion area. For example, if the first conversion area is coated with a red fluorescent powder, since blue light has a higher frequency than red light, when a blue light beam emitted from the first light source module 1 is incident on the first conversion area, the red fluorescent powder will be excited to from red light, and the wavelength of red light is larger than the wavelength of blue light. If the first conversion area is coated with a yellow fluorescent powder, when a blue light beam emitted from the first light source module 1 is incident on the first conversion area, the yellow fluorescent powder will be excited to form yellow light. In practical applications, the wavelength conversion device is a rotatable fluorescence wheel. Moreover, it should be noted that, in order to reduce light loss, the above-mentioned wavelength conversion device 5 can also be designed as an all-reflection type, that is, all light beams incident on the wavelength conversion device 5 are used to excite the fluorescent powder on the wavelength conversion device 5 to form new light beams without passing through the wavelength conversion device 5, which depends on the actual situation.

In this embodiment, the length-width ratio of the array of lasers is the same as the length-width ratio of the array of microlenses of the spatial light modulator, and then focusing process is directly implemented by the set of lenses. The first light-combination device is placed at the focus of the light converging lens. After the focused laser light passes through the fluorescence collection system, a light spot with a uniform distribution will be formed on the fluorescence wheel. The spot has a rectangular shape, and a length-width ratio of the light spot is consistent with a length-width ratio of the spatial light modulator (SLM).

Figure 2:
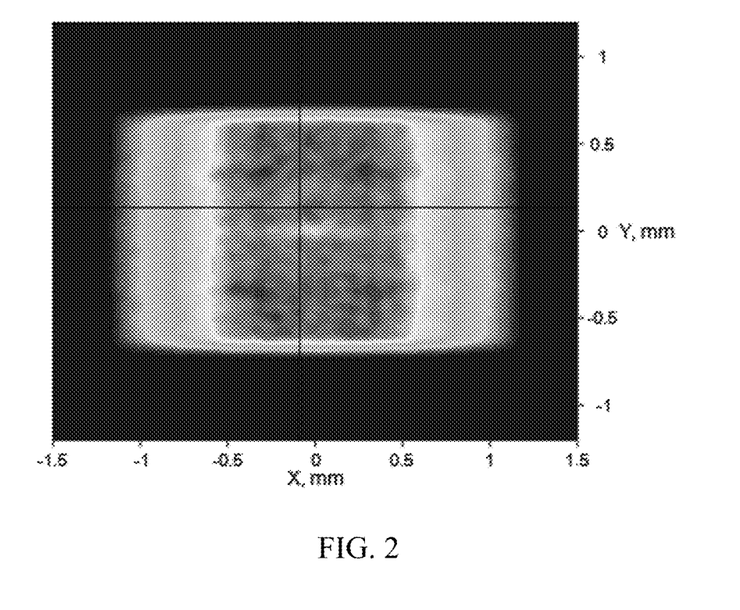
FIG. 2 is a schematic diagram illustrating a shape of a light spot formed on a wavelength conversion device of a light source device according to the first embodiment of the present disclosure.
Figure 3:
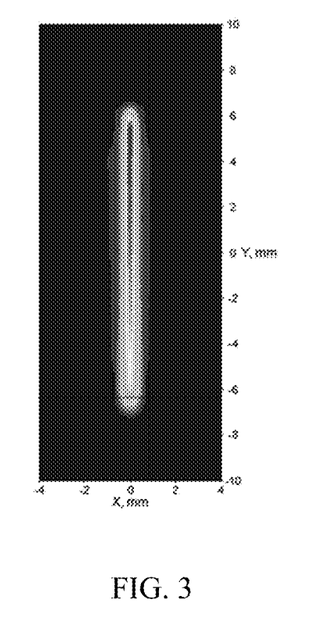
FIG. 3 is a schematic diagram illustrating a shape of a light spot formed by each laser chip on a first spectroscopic device according to the present disclosure.

FIG. 2 is a schematic diagram illustrating a shape of a light spot formed on a wavelength conversion device of a light source device according to the first embodiment of the present disclosure. FIG. 3 is a schematic diagram illustrating a shape of a light spot formed by each laser chip on a first spectroscopic device according to the present disclosure. The light spot formed by the first light source module and/or the second light source module on the first light-combination device or on the third light-combination device according to any of the first embodiment to the seventh embodiment has a shape similar to that shown in FIG. 3.

It can be seen from FIG. 3 that in the present disclosure, the light spot formed by each laser chip on the dichroscope can have a smaller shape. Thus, the coated film having functions of transmitting the excitation light (for example, blue light and/or red light) and reflecting the excited light (for example, yellow light) arranged on the dichroscope can correspondingly have a smaller shape. Therefore, loss caused by the unexcited excitation light being reflected by the fluorescence wheel and passing through the coated film can be reduced.

The specific shape of the light spot formed by the first light source module on the first light-combination device can be determined based on the shape of the laser light source chip. For example, when the light source is an array of lasers, the rectangular shape is narrowed to be approximately a linear shape, so that the entire device reduces the loss of unexcited excitation light and/or light having the same or similar wavelength as the excitation light, thereby improving the uniformity of the system. Specifically, the light source has an imaging shape on the dichroscope that satisfies the following formula: $f1 \times s1 = f2 \times s2$. Herein, $f1$ is a focal length of a collimating lens, $s1$ is an area of the excitation light chip (either for a single one or for each in the array), $f2$ is a focal length of a convergent lens closest to the dichroscope, and $s2$ is an area of a light spot on the dichroscope.

Furthermore, in this embodiment, a first light-homogenization component is provided between the set of lenses and the first light-homogenization device and used to divide the light spot, so that the light spot on the fluorescence wheel can be homogenized, thereby improving the excitation efficiency of the fluorescence wheel.

On the basis of the above embodiments, the light source module provided by the present disclosure may further include:

a set of compression lenses 6, located in front of the first light-homogenization component 3 in the propagation path of the light beam, and configured to compress the light spot of the first light beam.

Specifically, the set of compression lenses includes one or more of a positive compression lens or a negative compression lens.

Figure 4:
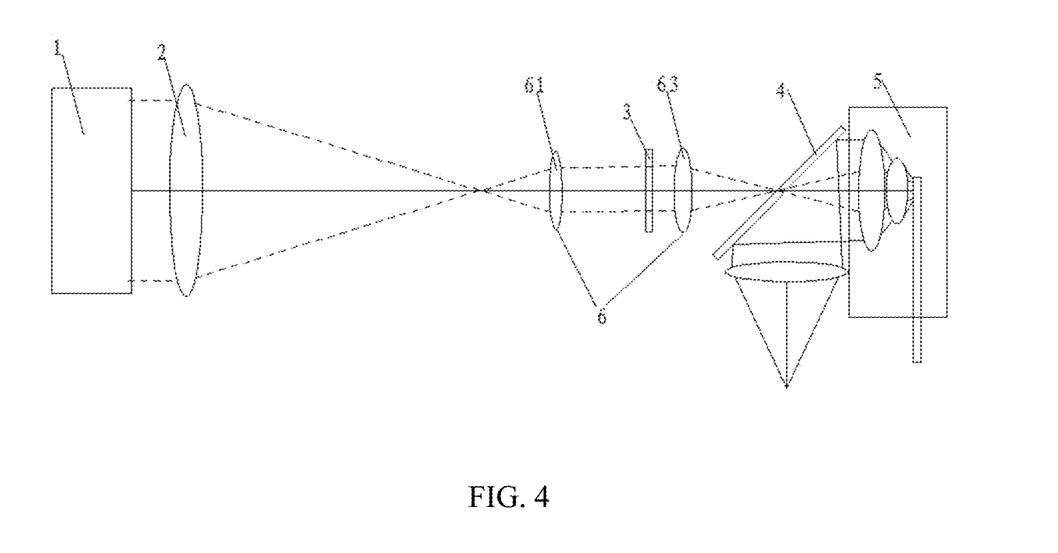
FIG. 4 is a schematic structural diagram of a light source device according to a second embodiment of the present disclosure.
Figure 5:
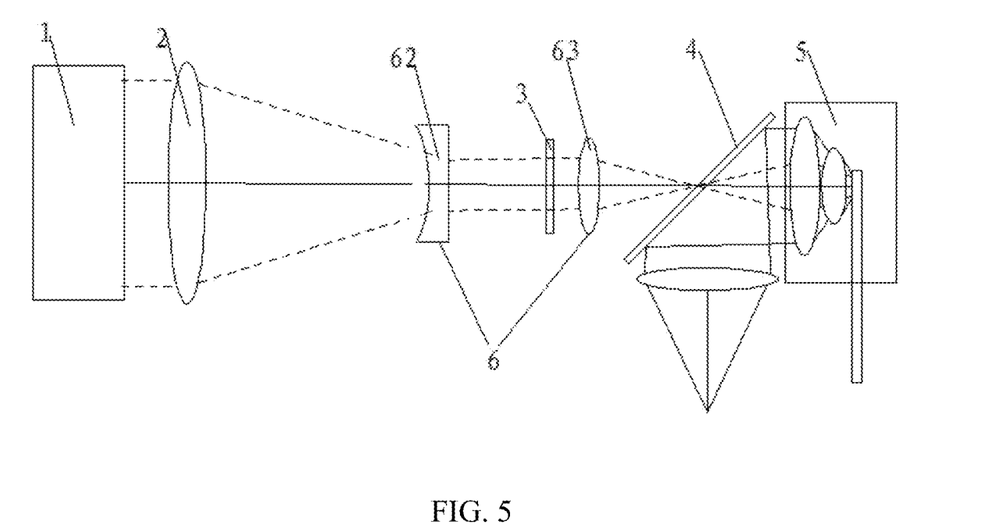
FIG. 5 is a schematic structural diagram of a light source device according to a third embodiment of the present disclosure.

FIG. 4 is a schematic structural diagram of a light source device according to a second embodiment of the present disclosure, and FIG. 5 is a schematic structural diagram of a light source device according to a third embodiment of the present disclosure. As shown in FIG. 4 and FIG. 5, compared with the above embodiments, the set of compression lenses 6 is further provided in this embodiment, which can be applied to an array of lasers with a large bore diameter. Since the first light converging lens has a large bore diameter, the focal length thereof is long, leading to a large area. Therefore, it is necessary to use the set of compression lenses 6 to compress the light spot of the laser light so as to reduce the area. The set of compression lenses in the second embodiment is a positive compression lens 61, and the set of compression lenses in the third embodiment is a negative compression lens 62, which can reduce the volume of the system. In the second embodiment and in the third embodiment, a second light converging lens 63 may be further included. The second light converging lens 63 and the positive compression lens 61, or the second light converging lens 63 and the negative compression lens 62 together form a set of compression lenses.

On the basis of any of the above embodiments, the light source device provided by the present disclosure may further include a second light source module 7 and a second light-combination device 8.

The second light source module 7 is configured to emit a fourth light beam having a third wavelength.

The second light-combination device 8 is located in propagation paths of the first light beam and the fourth light beam and configured to transmit or reflect the first light beam and correspondingly reflect or transmit the fourth light beam.

In this embodiment, the first light source module 1 may be an array of blue lasers, and the second light source module 6 may be an array of red lasers. The first light-combination device 4 combines light beams of the first light beam and the fourth light beam after light homogenization by the first light-homogenization component 3.

The first light-combination device is a dichroscope and configured to split the second light beam, and a first sub-light beam is transmitted or reflected to the wavelength conversion device.

Figure 6:
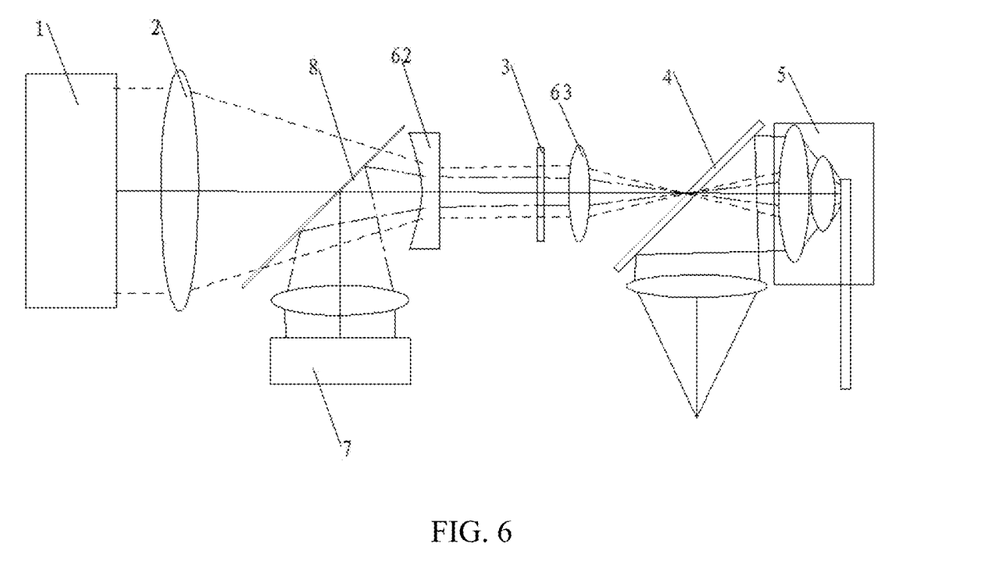
FIG. 6 is a schematic structural diagram of a light source device according to a fourth embodiment of the present disclosure.
Figure 7:
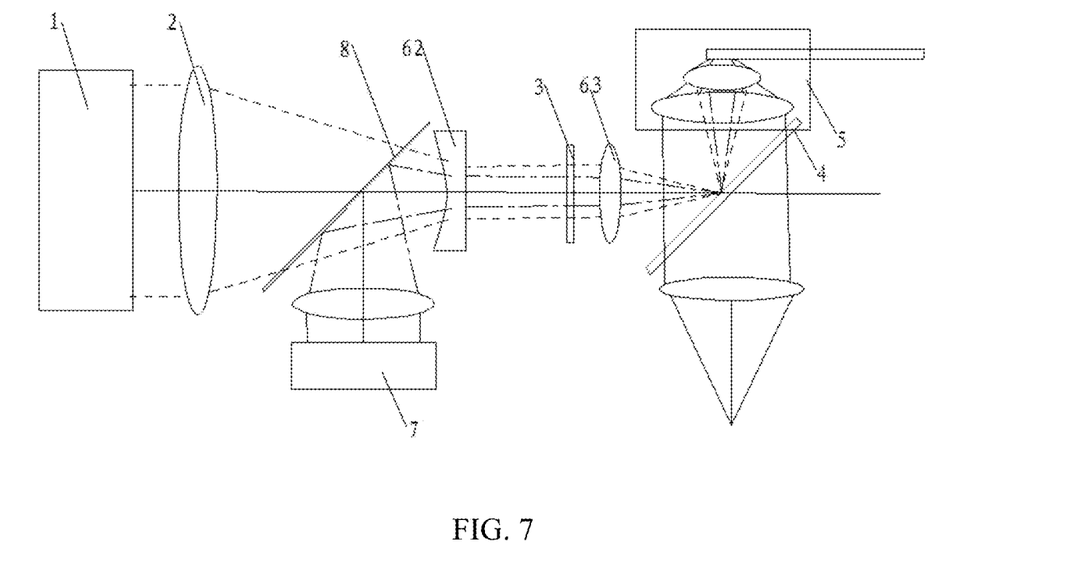
FIG. 7 is a schematic structural diagram of a light source device according to a fifth embodiment of the present disclosure.

FIG. 6 is a schematic structural diagram of a light source device according to a fourth embodiment of the present disclosure. FIG. 7 is a schematic structural diagram of a light source device according to a fifth embodiment of the present disclosure. As shown in FIG. 6, a light beam emitted from the first light source module 1 and a light beam emitted from the second light source module 7 are combined by the second light-combination device 8, and then homogenized by the first light-homogenization component 3. The homogenized light beam is incident on the first light-combination device 4 and is combined by the first light-combination device 4, and then the transmitted light beam reaches the fluorescence wheel. In this embodiment, the first light-combination device is specifically a partially coating film, and the first light-combination device is coated in such a manner that a red light beam or a blue light beam can pass through a middle area and a green light beam will be reflected, and the other area reflects all of the incident light beams.

The light split performance of the partially coating film shown in FIG. 7 changes from transmission of incident light to reflection of incident light, that is, a red light beam or a blue light beam will be reflected by the middle area and a green light beam will pass through, and the other area transmits all of the incident light beams. Compared with the fourth embodiment, this embodiment can further improve the efficiency and reliability of the system.

In this embodiment, the light spot formed by at least one of the first light source module 1 or/and the second light source module 7 on the first light-combination device 4 has a shape that matches the shape of a light-emitting component.

It should be noted that in the embodiments including the array of red lasers, it is preferable that the blue and red lasers are simultaneously (combined light) incident on the wavelength conversion device through the first light-homogenization component only when the blue light excites the red fluorescence area. In other cases, the blue light is incident on the wavelength conversion device individually (i.e., there is no combined light in this case).

Figure 8:
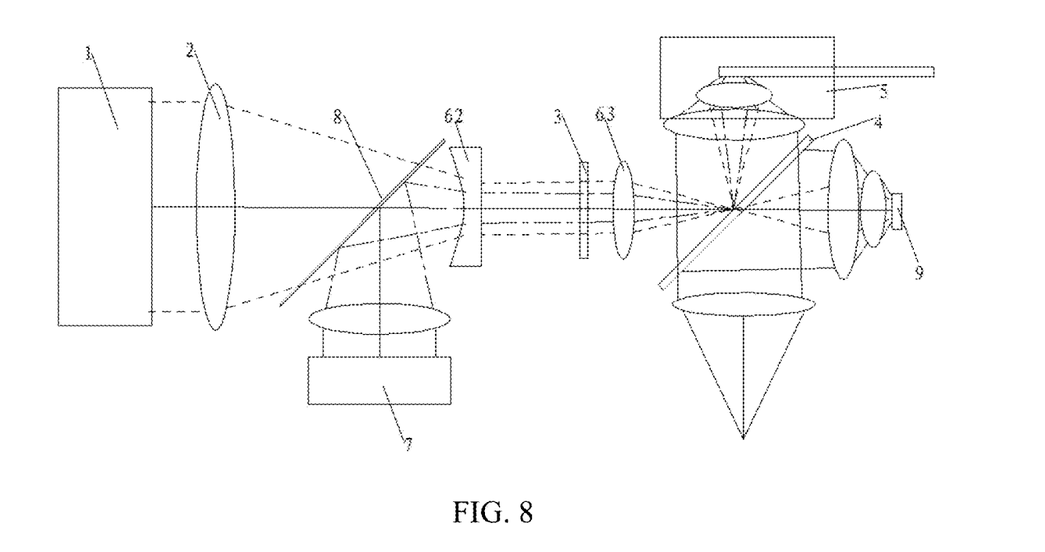
FIG. 8 is a schematic structural diagram of a light source device according to a sixth embodiment of the present disclosure.

FIG. 8 is a schematic structural diagram of a light source device according to a sixth embodiment of the present disclosure. Compared with the above embodiments, a scattering plate 9 is further provided in the sixth embodiment. A first sub-light beam of the first light-combination device 4 is incident on a subsequent wavelength conversion device 5, and a second sub-light beam is reflected or transmitted to the scattering plate 9. In this embodiment, the first light source module 1 is an array of blue lasers, and the second light source module 7 is an array of red lasers. The incident blue light is split into two parts by the first light-combination device 4, a large part of the light is reflected to the fluorescence wheel to excite the fluorescent powder, and a small part of the light is transmitted to the scattering plate 9. This embodiment can reduce the heat generated on the fluorescence wheel and improve the efficiency of the fluorescence wheel.

Figure 9:
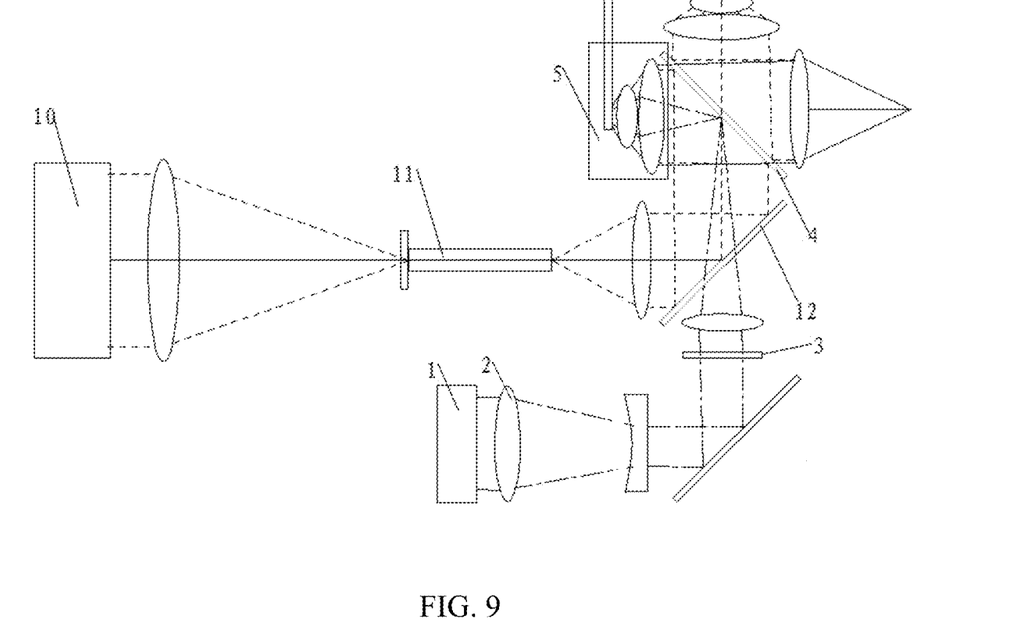
FIG. 9 is a schematic structural diagram of a light source device according to a seventh embodiment of the present disclosure.

Furthermore, FIG. 9 is a schematic structural diagram of a light source device according to a seventh embodiment of the present disclosure, and the device further includes:

a third light source module 10, a second light-homogenization component 11 and a third light-combination device 12.

The third light source module 10 is configured to emit a fifth light beam having a fourth wavelength;

The second light-homogenization component 11 is located in the propagation path of the fifth light beam and configured to homogenize the fifth light beam. The sixth light beam formed after the homogenization and the second light beam are together incident on the third light-combination device 12, and then incident on the first light-combination device 4.

The first light source module 1 may be specifically an array of red lasers, the third light source module 10 may be specifically an array of blue lasers. The second light-homogenization component 11 is a light-homogenization rod. The first light-combination device 4 makes a middle portion of the blue light incident on the scattering plate, and makes the other portion of the blue light and the red light incident on the wavelength conversion device 5.

The blue laser light portion is homogenized by a rod, and the homogenized light is imaged onto the fluorescence wheel through a relay system. The red light portion is homogenized by the set of lenses and the first light-homogenization component. The light spot of the blue laser light after the relay system has a large bore diameter, in which the middle portion of the blue light is incident on the scattering plate 9, and the other portion of the blue light and the red light are incident on the fluorescence wheel. The size of the middle area can be determined by the proportion of the red light portion and the blue light to be distributed, and the purpose is to maximize the efficiency of the red light. Moreover, this solution solves the problem that the power density of the blue light irradiating on the diaphragm is too high, thereby preventing the partially coating film from being burned, so that the reliability of the system is ensured.

The first light source module 1 and/or the third light source module can be used in combination with the reflection element, so as to vary the optical axis of the light beam emitted from the first light source module 1, thereby facilitating the arrangement of the overall structure of the light source device, making it more compact. As shown in FIG. 9, the array of red lasers emits a first light beam which is incident on the reflection element after the set of lenses. After its optical axis is rotated by 90 degrees, the light beam is incident on the first light-homogenization component 3. It should be noted that the function of the reflection element is to change the direction of the optical path so as to make the structure compact, but it is not necessary. In practice, the designer can decide whether to use it according to the layout and space of the actual light source device.

Figure 10:
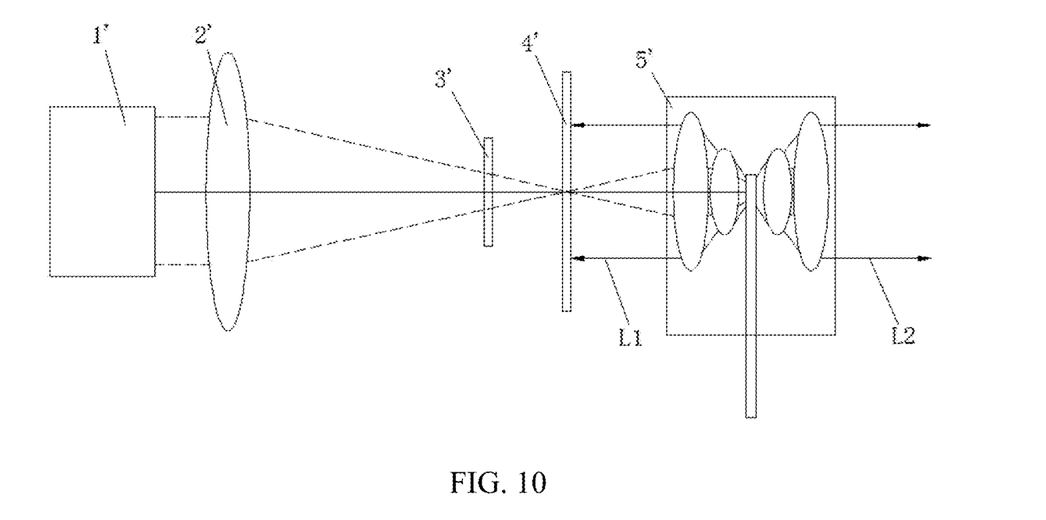
FIG. 10 is a schematic structural diagram of a light source device according to an eighth embodiment of the present disclosure.
Figure 11:
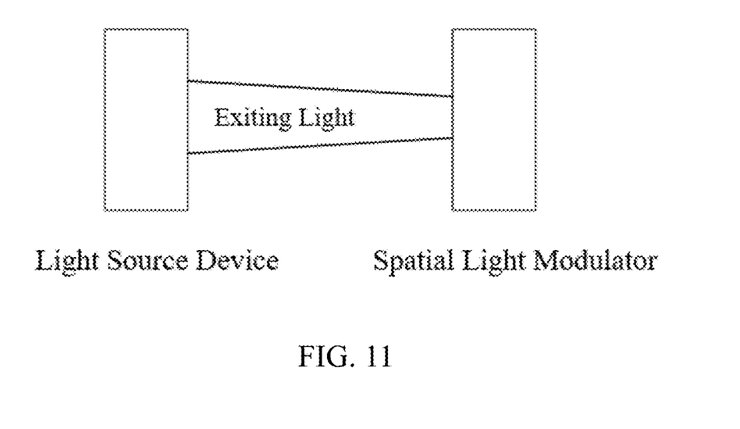
FIG. 11 is a schematic structural diagram of a projection device according to an embodiment of the present disclosure.

FIG. 10 is a schematic structural diagram of a light source device according to an eighth embodiment of the present disclosure. For example, the wavelength conversion device includes a fluorescence collection lens and a fluorescence wheel. The fluorescence wheel of the wavelength conversion device in each of the above embodiments uses a reflective fluorescence wheel, whereas the light source device of this embodiment uses a transmissive fluorescence wheel. Specifically, with reference to FIG. 2 and the related description of the first embodiment, the first light source module 1' emits a first light beam having a first wavelength, and then the first light beam reaches the wavelength conversion device 5' after the set of lenses 2', the first light-homogenization component 3', and the first light-combination device 4'. It is known that the first light-homogenization component 3' is coated with a film at the area irradiated by the first light beam. It has been described in details with respect to this film and will not be further described herein. Therefore, when the first light beam excites the fluorescence on the transmissive fluorescence wheel, a large part of the excited light (shown as L2 in FIG. 10) will pass through the transmissive fluorescence wheel to be emitted, since the excited light is in a Lambertian distribution, it is difficult to avoid that a small part of the excited light (shown as L1 in FIG. 10) will irradiate toward the first light-combination device 4', and a small part of the unexcited excitation light (shown as L1 in FIG. 10) may also irradiate toward the first light-combination device 4' under an action of the scattering, reflection or other types of fluorescence wheels. Therefore, since the area of the area required for the first light-combination device 4' to split the light is reduced as much as possible, when the wavelength of a small part of the excited light incident on the first light-combination device 4' is the same as or similar to the first wavelength, the loss caused by transmission of the excitation light affected by the abovementioned fluorescence wheel and/or the small part of the excited light through the coated film of the first light-combination device 4' is greatly reduced. Moreover, the area other than the coated area of the first light-combination device 4' in this embodiment can further guide the unexcited excitation light to the abovementioned transmissive fluorescence wheel to further excite the fluorescent powder as the wavelength conversion material, therefore, the excitation efficiency of the excitation light is also improved.

Furthermore, the present disclosure provides a projection device including any of the abovementioned light source devices. The light source device can have the structure and function in the above embodiments. The projection system can adopt various projection techniques, such as a liquid crystal display (LCD) projection technique and a digital light processor (DLP) projection technique.

It should be noted that the various embodiments in the present specification are described in a progressive manner, and each embodiment focuses on differences from other embodiments, and the same and similar parts between the various embodiments can be referred to each other. For the device disclosed in each embodiment, since it corresponds to the method disclosed in the embodiments, the description thereof is simple and the relevant part can be referred to the method embodiments.

The light source device and the projection device provided by the present disclosure have been described in details hereinbefore. The principle and implementation of the present disclosure have been described through some exemplary embodiments. It should be noted that the description of the above embodiments are merely for better illustrating the method and main concept of present disclosure. Meanwhile, those skilled in the art can make some improvements and modifications with respect to the embodiments without departing from the principle of the present disclosure, which all shall fall within the scope of the present disclosure.

The invention claimed is:

1. A light source device, comprising:
   a first light source module, a set of lenses, a first light-homogenization component, a first light-combination device, and a wavelength conversion device;
   wherein the first light source module is configured to emit a first light beam having a first wavelength;
   the set of lenses is located in a propagation path of the first light beam and configured to focus the first light beam, the focused first light beam is incident on the first light-combination device, and the first light-combination device is located at a focus position of the set of lenses, so that surface distribution of the first light source module is imaged onto the wavelength conversion device;
   the wavelength conversion device is located in a propagation path of a third light beam emitted from the first light-combination device and is configured to generate excited light having a second wavelength under excitation.

2. The light source device according to claim 1, wherein the set of lenses comprises a first light converging lens, and the first light-combination device is located at a focus position of the first light converging lens;
   or the set of lenses comprises a combination of a plurality of lenses, and the first light-combination device is located at a focus position of a lens of the plurality of lenses closest to the first light-combination device in a propagation path of a light beam.

3. The light source device according to claim 1, wherein exiting light of the light source device is incident to a spatial light modulator configured to modulate the exiting light, the first light source module is an array of first lasers, and a length-width ratio of the array of first lasers is equal to the length-width ratio of an array of microlenses of a spatial light modulator.

4. The light source device according to claim 1, further comprising a set of compression lenses, located in front of the first light-homogenization component in the propagation path of the light beam, and configured to compress a light spot of the first light beam.

5. The light source device according to claim 4, wherein the set of compression lenses comprises one or more of a positive compression lens or a negative compression lens.

6. The light source device according to claim 1, further comprising:
   a second light source module configured to emit a fourth light beam having a third wavelength; and
   a second light-combination device located in a light path of the first light beam and the fourth light beam, and configured to transmit or reflect the first light beam and correspondingly reflect or transmit the fourth light beam.

7. The light source device according to claim 6, wherein the first light source module comprises an array of blue lasers, the second light source module comprises an array of red lasers, the first light-combination device combines light beams of the first light beam and the fourth light beam after being homogenized by the first light-homogenization component.

8. The light source device according to claim 7, wherein the first light-combination device is a dichroscope and configured to split the second light beam into a first sub-light and a second sub-light, and the first sub-light light is transmitted or reflected to the wavelength conversion device.

9. The light source device according to claim 8, further comprising:
   a scattering plate corresponding to the first sub-light from the first light-combination device, and the second sub-light is reflected or transmitted to the scattering plate.

10. The light source device according to claim 1, further comprising:
    a second light source module configured to emit a fourth light beam having a third wavelength; and
    a second light-combination device located in a light path of the first light beam and the fourth light beam, and configured to transmit or reflect the first light beam and correspondingly reflect or transmit the fourth light beam.

11. The light source device according to claim 1, further comprising:
    a third light source module, a second light-homogenization component and a third light-combination device;
    wherein the third light source module is configured to emit a fifth light beam having a fourth wavelength; and
    the second light-homogenization component is located in a propagation path of the fifth light beam and configured to homogenize the fifth light beam, and a sixth light beam formed after homogenization and the second light beam together are incident on the third light combination device and then are incident on the first light-combination device.

12. The light source device according to claim 11, wherein the first light source module is an array of red lasers, the third light source module is an array of blue lasers, the second light-homogenization component is a light-homogenization rod, the first light-combination device makes a middle portion of blue light incident on the scattering plate and makes red light and a remaining portion of the blue light incident on the wavelength conversion device.

13. The light source device according to claim 1, further comprising:
    a third light source module, a second light-homogenization component and a third light-combination device;
    wherein the third light source module is configured to emit a fifth light beam having a fourth wavelength; and
    the second light-homogenization component is located in a propagation path of the fifth light beam and configured to homogenize the fifth light beam, and a sixth light beam formed after homogenization and the second light beam together are incident on the third light combination device and then are incident on the first light-combination device.

14. A projection device, comprising a light source device, wherein the light source device comprises:
    a first light source module, a set of lenses, a first light-homogenization component, a first light-combination device, and a wavelength conversion device;
    wherein the first light source module is configured to emit a first light beam having a first wavelength;
    the set of lenses is located in a propagation path of the first light beam and configured to focus the first light beam, the focused first light beam is incident on the first light-combination device, and the first light-combination device is located at a focus position of the set of lenses, so that surface distribution of the first light source module is imaged onto the wavelength conversion device;

the wavelength conversion device is located in a propagation path of a third light beam emitted from the first light-combination device and is configured to generate excited light having a second wavelength under excitation.

15. The projection device according to claim 14, wherein exiting light of the light source device is incident to a spatial light modulator configured to modulate the exiting light, the first light source module is an array of first lasers, and a length-width ratio of the array of first lasers is equal to the length-width ratio of an array of microlenses of a spatial light modulator.

16. The projection device according to claim 14, wherein the light source device further comprises a set of compression lenses located in front of the first light-homogenization component in the propagation path of the light beam and configured to compress a light spot of the first light beam.

17. The projection device according to claim 14, wherein the light source device further comprises further comprises:
   a second light source module configured to emit a fourth light beam having a third wavelength; and
   a second light-combination device located in a light path of the first light beam and the fourth light beam, and configured to transmit or reflect the first light beam and correspondingly reflect or transmit the fourth light beam.

18. The projection device according to claim 17, wherein the first light source module comprises an array of blue lasers, the second light source module comprises an array of red lasers, the first light-combination device combines light beams of the first light beam and the fourth light beam after being homogenized by the first light-homogenization component.

19. The projection device according to claim 18, wherein the first light-combination device is a dichroscope and configured to split the second light beam into a first sub-light and a second sub-light, and the first sub-light light is transmitted or reflected to the wavelength conversion device; and
   the light source device further comprises:
   a scattering plate corresponding to the first sub-light from the first light-combination device, and the second sub-light is reflected or transmitted to the scattering plate.

20. The projection device according to claim 14, wherein the light source device further comprises:
   a third light source module, a second light-homogenization component and a third light-combination device;
   wherein the third light source module is configured to emit a fifth light beam having a fourth wavelength; and
   the second light-homogenization component is located in a propagation path of the fifth light beam and configured to homogenize the fifth light beam, and a sixth light beam formed after homogenization and the second light beam together are incident on the third light combination device and then are incident on the first light-combination device.

* * * * *